United States Patent [19]

Bradin

[11] Patent Number: 5,578,090
[45] Date of Patent: Nov. 26, 1996

[54] BIODIESEL FUEL

[75] Inventor: David S. Bradin, Atlanta, Ga.

[73] Assignee: BRI, Macon, Ga.

[21] Appl. No.: 477,261

[22] Filed: Jun. 7, 1995

[51] Int. Cl.$^6$ ..................................................... C10L 1/18
[52] U.S. Cl. .................................. 44/308; 44/388; 44/398
[58] Field of Search ................................ 44/308, 398, 388

[56] References Cited

U.S. PATENT DOCUMENTS

| | | |
|---|---|---|
| 4,071,567 | 1/1978 | Ancillotti et al. . |
| 4,128,913 | 1/1980 | Takezono et al. . |
| 4,198,530 | 4/1980 | Wentheimer et al. . |
| 4,267,393 | 5/1981 | Torck et al. . |
| 4,299,997 | 11/1981 | Matsumoto et al. . |
| 4,584,415 | 4/1986 | Klotz . |
| 4,590,294 | 5/1986 | Ballantine et al. . |
| 5,004,478 | 4/1991 | Vogel et al. ............................... 44/398 |
| 5,160,506 | 11/1992 | Schur et al. ............................... 44/307 |

FOREIGN PATENT DOCUMENTS

| | | |
|---|---|---|
| 0194165 | 9/1986 | European Pat. Off. . |
| 0608149 | 7/1994 | European Pat. Off. . |

OTHER PUBLICATIONS

Clark, S. J. et al., "Methyl and Ethyl Soybean Esters as Renewable Fuels for Diesel Engines," JAOCS, vol. 61, No. 10(1984), pp. 1632–1638.

Holmberg, William C. et al., "Biodiesel: A Technology, Performance, and Regulatory Overview," American Biofuels Association Information Resources, Inc., 1994, pp. 1–52.

Korus, Roger A. et al., "Transesterification Process to Manufacture Ethyl Ester of Rape Oil," First Biomass Conference of the Americas: Energy, Environment, Agriculture, and Industry, Proceedings vol. II, 1993, pp. 815–826.

Peterson, C. L. et al., "Batch Type Transesterification Process for Winter Rape Oil," American Society of Agricultural Engineers, vol. 7, No. 6, 1991, pp. 711–716.

Primary Examiner—Jacqueline V. Howard
Attorney, Agent, or Firm—David Bradin

[57] ABSTRACT

A fuel additive composition including fatty acid alkyl esters and glyceryl ethers, and an alternative fuel composition that includes the fuel additive composition. Also provided is a method for preparing the fuel additive composition and the alternative fuel composition. In one embodiment, the fuel additive composition is prepared by esterifying free fatty acids and etherifying glycerol with one or more olefins in the presence of an acid catalyst. In one embodiment, the fuel additive composition can be thermally cracked under conditions of increased temperature and/or pressure in the presence of a Lewis acid catalyst. In another embodiment, the fuel additive composition is hydrocracked. The resulting fuel additive composition can be blended with diesel fuel to produce an alternative fuel composition. In one embodiment, the alternative fuel composition includes between approximately 25 and 95 percent diesel fuel and between approximately 5 and 75 percent of the fuel additive composition.

7 Claims, No Drawings

BIODIESEL FUEL

FIELD OF THE INVENTION

This invention relates to biodiesel fuels, which are blends of petroleum-based diesel fuel and fuels derived from biological, renewable sources.

BACKGROUND OF THE INVENTION

Diesel fuel is a refined petroleum product which is burned in the engines powering most of the world's trains, ships, and large trucks. Petroleum is, of course, a non-renewable resource of finite supply. Acute shortages and dramatic price increases in petroleum and the refined products derived from petroleum have been suffered by industrialized countries during the past quarter-century. Further, diesel engines emit relatively high levels of certain pollutants, especially particulates. Accordingly, extensive research effort is now being directed toward replacing some or all petroleum-based diesel fuel with a cleaner-burning fuel derived from a renewable source such as farm crops.

Vegetable oils have been directly added to diesel fuel in an attempt to replace at least a portion of the diesel fuel. These vegetable oils are composed mainly of triglycerides, and often contain small amounts (typically between 1 and 10% by weight) of free fatty acids. Some vegetable oils also contain small amounts (typically less than a few percent by weight) of mono- and di-glycerides.

Triglycerides are esters of glycerol, $CH_2(OH)CH(OH)CH_2(OH)$, and three fatty acids. Fatty acids are, in turn, aliphatic compounds containing 4 to 24 carbon atoms and having a terminal carboxyl group. Diglycerides are esters of glycerol and two fatty acids, and monoglycerides are esters of glycerol and one fatty acid. Naturally occurring fatty acids, with only minor exceptions, have an even number of carbon atoms and, if any unsaturation is present, the first double bond is generally located between the ninth and tenth carbon atoms. The characteristics of the triglyceride are influenced by the nature of their fatty acid residues. Some of the more common fatty acid residues found in naturally occurring fats and oils are listed in Table 1:

TABLE 1

| Common Fatty Acid Radicals | |
|---|---|
| Common Name | Chemical Name |
| Caprylic | Octanoic |
| Capric | Decanoic |
| Lauric | Dodecanoic |
| Myristic | Tetradecanoic |
| Palmitic | Hexadecanoic |
| Stearic | Octadecanoic |
| Caproleic | 9-Decanoic |
| Lauroleic | 9-Dodecanoic |
| Oleic | 9-Octadecanoic |
| Linoleic | 9,12-Octadecadienoic |
| Linolenic | 9,12,15-Octadecatrienoic |

When pure vegetable oils are used as a fuel source in diesel engines, they often cause excessive engine wear and fuel injector coking, and have high smoke values. Further, their viscosity is much higher than petroleum based diesel fuel.

Various attempts have been made to prepare microemulsions of oils and alcohols using a surfactant, and use these microemulsions as alternative fuels. A limitation of these emulsions is that they may not be stable in extreme temperatures, and the alcohol may tend to absorb water from the air, requiring the use of special storage tanks to keep the fuel dry.

In an effort to overcome some of the problems associated with using pure vegetable oils, several attempts have been made to use fatty acid methyl esters. These esters are typically prepared by completely transesterifying triglycerides, the major component in fats and oils, with methanol, in the presence of an acid or base catalyst.

In Europe, large quantities of fatty acid methyl esters are produced by reacting rapeseed oil with methanol in the presence of a strong base.

The glycerol by-product of this reaction is immersible with the methyl esters and is separated. The fatty acid methyl ester-rich stream is washed with water and then blended with diesel fuel at varying ratios. Unfortunately, the reaction is relatively hazardous and produces large amounts of waste products. Furthermore, fuels based on fatty acid methyl esters are not without their adverse effects. Some research indicates that they cause higher emissions of nitrogen oxides ($NO_x$), increased wear on engine components, and fuel injector coking. An article entitled "Progress in Diesel Fuel from Crop Oils," *AgBiotechnology*, (1988), indicated that pure vegetable oils and methyl esters both tend to choke the engine with carbon deposits. The authors indicated that diesel engines could probably be run for a single season with these vegetable oils or fatty acid methyl esters, but the engines would then have to be torn down and cleaned up to remove the deposits.

When fatty acid methyl esters are burned, they do not provide as much power as when petroleum diesel is burned (See, for example, Jori, et al., "Comparative test with different biodiesel fuels in tractor engine," *Hungarian Agricultural Engineering*, 6:7, 27–28 (1993). Often, diesel engines need to be retuned in order to run efficiently on biodiesel.

Fatty acid ethyl esters have also been used as a biodiesel fuel. However, even fatty acid ethyl esters produce less power when burned than petroleum-based diesel fuel. Duedraogo, et al., Diesel engine performance tests using oil from Jatrophacurcas L,"Agricultural Mechanization in Asia, Africa and Latin America, 22(4):25–29, 32 (1991), observed a 19 percent loss of power when using a fatty acid ethyl ester, as compared with conventional diesel fuel. Ethyl esters have many of the same problems associated with the methyl esters when used as fuel or fuel additives.

There remains a need for an improved fuel derived from renewable sources that can be blended with diesel fuel, and that does not damage an engine on long term use.

It is therefore an object of the present invention to provide an alternative fuel source that does not contain significant amounts of fatty acid methyl esters.

It is a further object of the present invention to provide an alternative fuel source that can run on existing engines without needing to retune the engines.

It is still a further object of the present invention to provide a fuel additive that, when combined with diesel fuel, does not damage the engine on long term use.

SUMMARY OF THE INVENTION

A biodegradable fuel additive composition, and an alternative fuel composition containing the additive is provided that includes one or more fatty acid alkyl esters, preferably ethyl esters and one or more glyceryl ethers. The composition optionally also contains free fatty acids, glycerol, and one or more alcohols. Also described is a process for preparing the fuel additive composition, and a process for preparing an alternative fuel composition from the additive composition.

The glyceryl ethers lower the viscosity of the fuel additive composition, relative to pure vegetable oils. Also, hydroxy groups on partially etherified glycerol may help to incorporate a small amount of water into the fuel, which can lower $NO_x$ emissions.

In one embodiment, the composition includes between approximately 10 and 75% of one or more fatty acid alkyl esters, 1 and 25% glyceryl ethers, 0 and 10% free fatty acids, and 0 and 10% triglycerides, and optionally includes between approximately 0 and 3 percent glycerin and 0 and 3 percent alcohol. In another embodiment, the composition includes between approximately 1 and 25% of one or more fatty acid alkyl esters, 10 and 75% glyceryl ethers, 0 and 10% free fatty acids, and 0 and 10% triglycerides, and optionally includes between approximately 0 and 3 percent glycerin and 0 and 3 percent alcohol.

In one embodiment, the fatty acid ethyl esters and the glyceryl ethers are derived by reacting free fatty acids and glycerol with olefins, in the presence of an acid catalyst. The esterification and etherification reactions can be run in separate reactors, or in one reactor. While glycerol and fatty acid alkyl esters are immiscible, the glycerol ethers and fatty acid alkyl esters are miscible.

The acid catalyst can be a proton source, such as hydrochloric acid, sulfuric acid, and hydrobromic acid, or can be a Lewis acid, for example, aluminum chloride, ferrous chloride, and zeolites.

The fatty acid alkyl esters and the glyceryl ethers can be prepared by any means known to those of skill in the art. Means for preparing fatty acid alkyl esters include transesterifying triglycerides with alcohols in the presence of an acid or base catalyst. Methods for preparing glyceryl ethers include reacting glycerol with an alkyl halide in the presence of a base, or with an olefin or an alcohol in the presence of an acid catalyst.

A preferred method for preparing the fatty acid alkyl esters and glyceryl ethers is by hydrolyzing or saponifying a triglyceride, and esterifying the fatty acid and at least partially etherifying the glycerol with an olefin in the presence of an acid catalyst. The hydrolysis of the triglyceride and the subsequent esterification of the free fatty acids and etherification of the glycerol can be run using the same acid catalyst. The etherification and esterification, when performed using an olefin, are preferably run at room temperature, to avoid excessive polymerization of the olefin. Use of ferrous chloride can be preferred, since this catalyst is known to minimize the polymerization of olefins. If the etherification and esterification are run at temperatures in excess of 70° C., a large degree of olefin dimerization, trimerization, and polymerization would be expected.

In one embodiment, the fuel additive composition is heated to a temperature of between approximately 100° and 500° F., and contacted with a Lewis acid catalyst, to thermally crack the hydrocarbon chains in the fatty acid alkyl esters. The Lewis acid can be any Lewis acid that is effective for cracking hydrocarbons, including but not limited to zeolites, clay montmorrilite, aluminum chloride, aluminum bromide, ferrous chloride and ferrous bromide. The catalyst preferably is a fixed-bed catalyst. Suitable hydrocarbon cracking catalysts are known to those of ordinary skill in the art.

In another embodiment, the fuel additive composition is hydrocracked. Hydrocracking conditions for hydrocarbons are well known to those of skill in the art.

In another embodiment the fuel additive composition is pyrolyzed. Conditions for pyrolyzing vegetable oils are known to those of skill in the art.

Any triglyceride can be used that provides a fuel additive composition with desired properties. Preferred sources of triglycerides include vegetable oils and fats, as well as animal oils and fats. Any vegetable oil can be used. Animal fats are preferably used. Preferably, animal fats comprise between approximately 1 and 50 percent by weight of the triglycerides. If animal fats comprise more than 50 percent of the triglycerides, the viscosity of the fuel additive composition may be too high for use at low temperatures.

If an alcohol is used to esterify the fatty acid or etherify the glycerol, the alcohol is preferably ethanol. Alternatively, the alcohol can be any $C_{1-6}$ straight, branched, or cyclic alcohol.

An alternative diesel fuel containing the fuel additive composition can be prepared by blending the fuel additive composition with diesel fuel. In one embodiment, the resulting alternative fuel contains between approximately 25 and 95 percent petroleum-based diesel fuel and between approximately 5 and 75 percent of the fuel additive composition.

The resulting alternative fuel is derived, in part, from renewable resources. By using olefins rather than alcohols to prepare the fuel additive composition, the method should be less expensive than existing biodiesel fuel preparations.

DETAILED DESCRIPTION OF THE INVENTION

A fuel additive composition that includes fatty acid alkyl esters and glyceryl ethers, as well as a method for preparing the composition, is disclosed. The fuel additive composition can be added to diesel fuel to provide an alternative diesel fuel composition.

Fuel Additive Composition

The fuel additive composition includes fatty acid alkyl esters and glyceryl ethers. Glyceryl ethers are defined as compounds compounds in which one, two or three of the hydroxy groups (OH) in glycerol has been etherified (O-alkyl). In one embodiment, the composition includes between approximately 10 and 75% fatty acid alkyl esters, preferably ethyl or butyl esters, 1 and 25% glyceryl ethers, 5 and 25% diglycerides, 0 and 10% triglycerides, and 0 and 10% free fatty acids, and optionally includes between approximately 0 and 3 percent glycerin and 0 and 3 percent of a $C_{1-6}$ straight, branched, or cyclic alcohol.

The term "alkyl", as used herein, unless otherwise specified, refers to a saturated straight, branched, or cyclic hydrocarbon of $C_1$ to $C_6$, and specifically includes methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl.

The term "olefin" refers to an unsaturated straight, branched or cyclic hydrocarbon of $C_2$ to $C_{10}$, and specifically includes ethylene, propylene, butylene, isobutylene, pentene, cyclopentene, isopentene, hexene, cyclohexene, 3-methylpentene, 2,2-dimethylbutene, 2,3-dimethylbutene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, and 5-decene. Ethylene, propylene and isobutylene are preferred olefins due to their relatively low cose. Highly substituted olefins are preferred because they can stabilize a carbocation intermediate more readily than unsubstituted olefins.

In one embodiment, the olefins are a mixture of olefins, in unpurified form, obtained by the cracking of crude oil. Since virtually any olefin will form a combustible product (an ester or an ether), it is unnecessary to form fatty acid esters or glyceryl ethers from pure olefins.

The composition is preferably derived from one or more triglycerides and one or more olefins. Preferably, the fuel additive composition is combined with diesel fuel to form an alternative fuel. The resulting alternative fuel preferably has a viscosity substantially similar to diesel fuel at a temperature range of between approximately −10° F. and 110° F. An appropriate viscosity can be achieved, for example, by adjusting the amounts of the individual components in the fuel additive composition or in an alternative fuel composition that includes the fuel additive composition. The viscosity of the fuel additive composition and the alternative fuel composition can be measured by means known to those of ordinary skill in the art, for example, using a viscometer.

Preferred fatty acid alkyl esters are ethyl esters. However, since methanol is less expensive than ethanol, blends of ethyl and methyl esters are slightly less expensive and can perform nearly as well in biodiesel fuel as pure ethyl esters, with the limitation of additional toxicity. Fuel additive compositions that include fatty acid butyl esters are also preferred.

The presence of the fatty acid ester derivatives of the present invention, in particular, the glyceryl ethers, in the fuel additive composition helps lower the gel temperature of the fuel, i.e., the temperature at which the fuel becomes so viscous that it cannot be used. The presence of hydroxy groups on partially etherified glycerol derivatives may also improve nitrogen oxide emissions and particulate emissions.

Method for Preparing the Fuel Additive Composition

Any method for preparing fatty acid alkyl esters and glyceryl ethers (in which one, two or three of the hydroxy groups on glycerol are etherified) can be used to prepare the components of the fuel additive composition. Methods for preparing fatty acid alkyl esters and glyceryl ethers are known to those of ordinary skill in the art. For example, Fatty acids can be prepared, for example, by hydrolyzing or saponifying triglycerides with acid or base catalysts, respectively, or using an enzyme such as a lipase or an esterase. Fatty acid alkyl esters can be prepared by reacting a fatty acid with an alcohol in the presence of an acid catalyst. Fatty acid alkyl esters can also be prepared by reacting a triglyceride with an alcohol in the presence of an acid or base catalyst. Glycerol ethers can be prepared, for example, by reacting glycerol with an alkyl halide in the presence of base, or with an olefin or alcohol in the presence of an acid catalyst.

A preferred method of preparing the fuel additive composition is by hydrolyzing or saponifying triglycerides with water, and reacting the resulting free fatty acids and glycerol with one or more olefins or alcohols, preferably olefins, with a suitable acid catalyst. The method is preferred because it uses relatively inexpensive reagents, water and an olefin, rather than the relatively more expensive alcohols.

When alcohols are used to esterify free fatty acids, and water is formed as a by-product that can dilute or destroy the acid catalyst. The resulting water layer can also separate to the bottom of the reaction mixture. When olefins are used to esterify free fatty acids, no water is produced as a by-product, and therefore, no water layer forms. A potential downside to using olefins is that they can dimerize, trimerize, or polymerize under acidic conditions. However, these derivatives also burn, and can even be desirable in some applications. Side reactions such as dimerization, trimerization, and polymerization can be controlled to some extent by adjusting the reaction conditions. For example, if the concentration of olefin is kept relatively low (and the concentration of free fatty acids and glycerol relatively high), side reactions are minimized. Low temperatures also disfavor side reactions.

The esterification and etherification reactions generally goes to completion in approximately six to twenty four hours, and can be run in both batch-type and continuous reactors. Reaction conditions for esterification and etherification reactions are known to those of skill in the art.

In unpublished work by the inventor, carboxylic acids were esterified using a slight excess of isobutylene, at approximately room temperature, in the presence of a catalytic amount of sulfuric acid. In this reaction, a small amount, typically less than approximately 4 percent, of the isobutylene was dimerized and trimerized. Since these dimers and trimers also burn well, and are highly branched, they should not adversely affect the composition. It was observed, however, that when the temperature of the esterification reaction exceeded approximately 50° C., as much as 8 percent of the reaction mixture comprised dimers and trimers of isobutylene. For this reason, it is preferred that the reactions be run at a temperature between room temperature and approximately 40° C. The temperature of the exothermic reactions can be controlled by means known to those of skill in the art.

If the free fatty acids and glycerol are obtained from the saponification or hydrolysis of triglycerides, the molar ratio of free fatty acids to glycerol is 3:1. Glycerol has up to three hydroxy groups to etherify, and the free fatty acids have only one carboxylic acid to esterify. Therefore, a mole ratio of free fatty acids/glycerol/olefins is at least 1:1:2, and can be as high as to 1:1:4, although excess olefin can be required due to undesirable side reactions. The preferred ratio is between approximately 1:1:2 to 1:1:3, since it is preferable to have glyceryl ethers with one or more hydroxy groups remaining.

The extent of esterification and etherification can be followed by means known to those of skill in the art, including high performance liquid chromatography and gas chromatography. Representative chromatography conditions for following the degree of esterification of fatty acids are described, for example, in Christopolou and Perkins, "High Performance Size Exclusion Chromatography of Fatty Acids, Mono-, Di- and Triglyceride Mixtures." The esterification and etherification are preferably run until the desired range of components, as discussed above, is obtained.

Neutralization of the Reaction Mixture

The fuel additive composition can be directly blended with diesel fuel, or washed with water or other aqueous solutions to remove various impurities, including the catalysts, before blending.

It is possible to neutralize acid catalysts with base. However, this process produces salt. To avoid engine corrosion, it is preferable to minimize the salt concentration in the fuel additive composition. Salts can be substantially removed from the fuel additive composition, for example, by washing the composition with water.

In another embodiment, the composition is dried after it is washed, for example, by passing the composition through a drying agent such as calcium sulfate.

In yet another embodiment, a neutral fuel additive is obtained without producing salts or using a washing step, by using a polymeric acid, such as Dowex 50™, which is a resin that contains sulfonic acid groups. The catalyst is easily removed by filtration after the esterification and etherification reactions are complete.

Optional Method Steps

Thermal Cracking of the Fuel Additive Composition

In some embodiments, after the esterification and etherification reaction, the viscosity of the fuel additive composition is slightly higher than diesel fuel. The viscosity can be lowered by thermally cracking, hydrocracking, or pyrolyzing the composition, preferably in the presence of a Lewis acid catalyst. These conditions provide lower molecular weight products, such as alkanes and aromatus, that have lower viscosities than the higher molecular weight fatty acid ester derivatives.

Methods for thermally cracking or hydrocracking hydrocarbons are known to those of skill in the art. Representative Lewis acid catalysts and reactions conditions are described, for example, in Fluid Catalytic Cracking II, Concepts in Catalyst Design, ACS Symposium Series 452, Mario Occelli, editor, American Chemical Society, Washington, D.C., 1991, the contents of which are hereby incorporated by reference. The pyrolysis of vegetable oils is described in Alencar, et al., Pyrolysis of Tropical Vegetable Oils, *J. Ag. Food Chem.*, 31:1268–1270 (1983), the contents of which are hereby incorporated by reference. The hydrocracking of vegetable oils is described in U.S. Pat. No. 4,992,605 to Craig et al., the contents of which are hereby incorporated by reference. The methods described above for thermally cracking, pyrolyzing, and hydrocracking vegetable oils are also effective with the fuel additive composition of the present invention.

In one embodiment, the fuel additive composition is heated to a temperature of between approximately 100° and 500° F., preferably to between approximately 100° and 200° F., and more preferably to between approximately 150° and 180° F., and then passed through a Lewis acid catalyst. Any Lewis acid catalyst that is effective for thermally cracking hydrocarbons can be used. Suitable catalysts for use in the present invention include, but are not limited to, zeolites, clay montmorrilite, aluminum chloride, aluminum bromide, ferrous chloride and ferrous bromide. Preferably, the catalyst is a fixed-bed catalyst.

A preferred catalyst is prepared by coating a ceramic monolithic support with lithium metal. Supports of this type are manufactured, for example, by Dow-Corning. Lithium is coated on the support by first etching the support with zinc chloride, then brushing lithium onto the support, and then baking the support.

The retention time through the Lewis acid catalyst can be as little as one second, although longer retention times do not adversely affect the product.

After passing through the Lewis acid catalyst, the derivative stream is then preferably heated to a temperature of between approximately 200° and 600° F., preferably between approximately 200° and 230° F., to thermally crack the product. The resulting product is suitable for blending with diesel fuel to form an alternative fuel composition.

Filtration of the Fuel Additive Composition

In one embodiment, the fuel additive composition is filtered, preferably through a filter with a pore size of between approximately 5 and 50 microns, more preferably, between approximately 10 and 20 microns, to remove solid impurities. This can be especially important when animal fats are used, since rendering processes can inadvertently place small pieces of bone and other particulate matter in the animal fat that needs to be removed.

Components Used to Prepare the Fuel Additive Composition

Triglycerides

Any source of triglycerides can be used to prepare the fatty acid ester derivatives that provides a fuel additive composition with the desired properties. Preferred sources of triglycerides for use in practicing the present invention include, but are not limited to, vegetable oils and fats, as well as animal oils and fats. Examples of suitable vegetable oils include, but are not limited to, crude or refined soybean, corn, coconut, palm, rapeseed, cotton and oils. Examples of suitable animals fats include, but are not limited to, tallow, lard, butter, bacon grease and yellow grease. Naturally-occurring fats and oils are the preferred source of triglycerides because of their abundance and renewability. Oils with a higher boiling point are preferred over oils with a lower boiling point.

If cost is not considered, the preferred source of vegetable oil is refined soybean oil, because of its abundance, purity, and high percentage of longchain fatty acids. However, a blend of soybean oil and tallow produces a satisfactory crop oil at a substantially reduced cost (the current price of tallow in the U.S.A. is less than one-half that of refined soybean oil). A blend of soybean oil with tallow generally contains at least about 50 percent soybean oil, and preferably contains at least about 70 percent soybean oil.

When animal fats are used, the water content of the fuel additive composition and the resulting alternative fuel composition can be adjusted to between approximately 600 and 1000 ppm, preferably between approximately 700 and 900 ppm. For reasons that are as yet not completely understood, a fuel additive composition with this small amount of water has reduced $NO_x$ emissions. For this reason, a preferred fuel additive composition contains at least an effective amount of animal fat and fatty acid ester derivatives derived from animal fat such that the water content of the resulting alternative fuel composition is between approximately 600 and 1000 ppm, more preferably between approximately 700 and 900 ppm. A preferred fuel additive composition is prepared in which between approximately 1 and 50% of the fatty acid alkyl esters, and mono-, di- and triglycerides are derived from animal fats.

Alcohols

Any alcohol can be used to prepare the fatty acid alkyl esters that provides a fuel additive composition with the desired properties. Suitable alcohols for use in the present invention include, but are not limited to, saturated straight, branched, or cyclic alcohols of $C_1$ to $C_6$, and specifically include methanol, ethanol, propanol, isopropanol, butanol, isobutanol, t-butanol, pentanol, cyclopentanol, isopentanol, neopentanol, hexanol, isohexanol, cyclohexanol, 3-methylpentanol, 2,2-dimethylbutanol, and 2,3-dimethylbutanol.

The preferred alcohol is ethanol. Ethanol is generally available commercially in a denatured form. A preferred form of denatured ethanol is grade 3A which contains minor amounts of methanol and water. Ethanol is produced commercially from ethylene and by fermentation of grains.

It is preferred that any alcohol used in the present invention contains less than five percent water, preferably less than approximately one percent water, to avoid saponification or hydrolysis of the triglycerides.

Olefins

Olefins suitable for the etherification and esterification include $C_{1-10}$ straight, branched, or cyclic olefins. It is preferred that these olefins contain only hydrogen and carbon. Suitable olefins for use in the present invention include, but are not limited to, ethylene, propylene, butylene, isobutylene, pentene, cyclopentene, isopentene, hexene, cyclohexene, 3-methylpentene, 2,2-dimethylbutene, 2,3-dimethylbutene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, and 5-decene. Ethylene, propylene and isobutylene are preferred olefins due to their relatively low cose. Highly substituted olefins are preferred because they can stabilize a carbocation intermediate more readily than unsubstituted olefins.

In one embodiment, the olefins are a mixture of olefins, in unpurified form, obtained by the cracking of crude oil. Since virtually any olefin will form a combustible product (an ester or an ether), it is unnecessary to form fatty acid esters or glyceryl ethers from pure olefins.

Catalysts

Any acid catalyst that is suitable for performing esterifications can be used, in any effective amount and any effective concentration. Examples of suitable acids include, but are not limited to, hydrochloric acid, hydrobromic acid, sulfuric acid, nitric acid, and solid catalysts such as Dowex 50™. Strong acids are preferred catalysts. The most preferred acid catalyst is sulfuric acid. In a preferred embodiment, approximately one cup of concentrated sulfuric acid is added per ten gallons of oil.

Additional Components

The fuel additive composition can also include additional components, such as detergents, octane boosters, cetane number improvers, metal deactivators, corrosion inhibitors, antioxidants, rust inhibitors, dispersants, and biocides. These components can be added in any effective amount to achieve a desired result, although they preferably amount to less than a few percent by weight of the composition.

Alternative Fuel Composition

The fuel additive composition prepared as described above can be used directly in a diesel engine, or can be blended with petroleum-based diesel fuel at a ratio such that the resulting alternative fuel composition contains between approximately 25 to 95 percent diesel fuel and between approximately 5 to 75 percent of the fuel additive composition. The components can be mixed in any suitable manner.

Modifications and variations of the present invention relating to a fuel additive composition and an alternative fuel derived from the composition will be obvious to those skilled in the art from the foregoing detailed description of the invention. Such modifications and variations are intended to come within the scope of the appended claims.

I claim:

1. A fuel additive composition comprising between approximately 10 and 75% fatty acid alkyl esters, 1 and 25% glyceryl ethers, and 0 and 10% triglycerides, wherein the alkyl group on the ethers and the esters is selected from the group consisting of $C_{1-10}$ straight, branched or cyclic alkanes.

2. The fuel additive of claim 1 wherein the fatty acid alkyl esters comprise ethyl esters.

3. The fuel additive of claim 1 wherein between approximately 1 and 50% by weight of the fatty acid alkyl esters are derived from animal fat.

4. The fuel additive of claim 1 wherein between approximately 1 and 100 percent by weight of the fatty acid alkyl esters are derived from soybean oil.

5. The fuel additive of claim 1 further comprising between approximately 25 and 95 percent petroleum-based diesel fuel.

6. The fuel additive composition of claim 5 wherein between approximately 25 and 75 percent of the fuel additive composition comprises fatty acid ethyl esters.

7. The fuel additive composition of claim 1 further comprising one or more additional components selected from the group consisting of detergents, octane boosters, cetane number improvers, metal deactivators, corrosion inhibitors, antioxidants, rust inhibitors, dispersants, and biocides.

* * * * *